(12) United States Patent
Olsson et al.

(10) Patent No.: US 11,938,624 B2
(45) Date of Patent: Mar. 26, 2024

(54) PARALLEL KINEMATIC ROBOT

(71) Applicant: ABB Schweiz AG, Baden (CH)

(72) Inventors: Mats Olsson, Västerås (SE); Tommy Thors, Västerås (SE); Daniel Lundbäck, Västerås (SE); Jeroen Derkx, Enköping (SE); Johan Ernlund, Västerås (SE)

(73) Assignee: ABB Schweiz AG, Baden (CH)

( * ) Notice: Subject to any disclaimer, the term of this patent is extended or adjusted under 35 U.S.C. 154(b) by 836 days.

(21) Appl. No.: 17/046,833

(22) PCT Filed: Apr. 24, 2018

(86) PCT No.: PCT/EP2018/060465
§ 371 (c)(1),
(2) Date: Oct. 12, 2020

(87) PCT Pub. No.: WO2019/206403
PCT Pub. Date: Oct. 31, 2019

(65) Prior Publication Data
US 2021/0362321 A1    Nov. 25, 2021

(51) Int. Cl.
*B25J 9/00* (2006.01)
*B25J 9/10* (2006.01)

(52) U.S. Cl.
CPC ............. *B25J 9/0051* (2013.01); *B25J 9/102* (2013.01); *B25J 9/0042* (2013.01)

(58) Field of Classification Search
CPC ........ B25J 9/0024; B25J 9/003; B25J 9/0042; B25J 9/0051; B25J 9/0087; B25J 9/102; B25J 9/103; B25J 19/0029
See application file for complete search history.

(56) References Cited

U.S. PATENT DOCUMENTS

| | | | |
|---|---|---|---|
| 7,926,377 B2* | 4/2011 | Larsson | B25J 9/103 901/29 |
| 8,109,173 B2* | 2/2012 | Kinoshita | B25J 17/0266 901/29 |

(Continued)

FOREIGN PATENT DOCUMENTS

| | | |
|---|---|---|
| DE | 102015225332 A1 | 6/2017 |
| EP | 2241416 A1 | 10/2010 |
| WO | 2013161036 A1 | 10/2013 |

OTHER PUBLICATIONS

International Search Report and Written Opinion of the Inetrational Searching Authority; Application No. PCT/EP2018/060465; Completed: Jan. 18, 2019; dated Jan. 28, 2019; 10 pages.

*Primary Examiner* — Adam D Rogers
(74) *Attorney, Agent, or Firm* — Whitmyer IP Group LLC (57) ABSTRACT

A parallel kinematic robot including a base unit, a platform movable in relation to the base unit about a plurality of main axes, two independently movable actuating arms connected between the base unit and the movable platform for moving the platform in relation the base unit, a tool holder rotatably connected to the platform to allow rotation of the tool holder in relation to the platform about a first auxiliary axis, a motor for driving the first auxiliary axis, located in the base unit, and a gear unit. The gear unit includes a first gearbox located in the base unit and a second gearbox located in the platform.

17 Claims, 5 Drawing Sheets

(56) References Cited

U.S. PATENT DOCUMENTS

| | | | | |
|---|---|---|---|---|
| 8,893,578 | B2* | 11/2014 | Kinoshita | B25J 17/0266 901/29 |
| 9,764,482 | B2* | 9/2017 | Ilch | B25J 9/0051 |
| D895,701 | S* | 9/2020 | Lundbäck | D15/199 |
| D895,702 | S* | 9/2020 | Lundbäck | D15/199 |
| D895,703 | S* | 9/2020 | Lundbäck | D15/199 |
| 10,960,538 | B2* | 3/2021 | Xiong | F16H 35/10 |
| 2009/0255364 | A1* | 10/2009 | Nishida | B25J 9/0051 74/490.07 |
| 2010/0206120 | A1 | 8/2010 | Kinoshita et al. | |
| 2015/0343631 | A1* | 12/2015 | Martinez-Esponda | B25J 15/0023 74/490.03 |

* cited by examiner

PARALLEL KINEMATIC ROBOT

TECHNICAL FIELD

The present invention relates to a parallel kinematic robot having at least four axes.

BACKGROUND

A parallel kinematic robot, also called a delta robot, or parallel manipulator operates by the so-called delta principle. A parallel kinematic robot has three arms connected between a base unit, also called a suspension, and a movable platform for carrying a tool, also called an end effector. The key design feature is the use of parallelograms in the arms, which maintains the orientation of the end effector. The platform is provided with a tool holder for attaching a tool to the platform. Motors and gearboxes for driving the three axes are arranged in the base unit.

A parallel kinematic robot can have three, four or five axes. The delta robot concept is a very efficient design for the three main axes 1-3. However, for practical use, most parallel kinematic robots also need at least one additional axis to enable rotation of a tool attached to the tool holder. The tool holder is then rotatably connected to the platform.

The most commonly used design for an additional axis 4 is to arrange an additional motor and gearbox for axis 4 in the base unit, and then transfer the rotation to the center of a rotatable shaft defining axis 4 in the moving platform, via a telescopic shaft in combination with two universal joints. The telescopic shaft is attached to the rotatable shaft.

DE102015225332 discloses a parallel kinematic robot comprising a base unit on which at least two separately driven and independently movable actuating arms are articulated, each by means of a movable upper arm and a lower arm hinged thereto. The robot comprises a movable platform articulated on the lower arms and movable by means of movements of the actuating arms within a definable movement space. The robot comprises two mechanical rotation transmission elements arranged to transfer rotational movements from actuators disposed in the base unit to the movable platform to provide two additional axes. The mechanical rotary transmission elements are formed by articulated and telescopic shafts. Further, the document discloses hollow shaft gears arranged in the base unit.

For heavier payloads (10 kg and higher) this design gives a very high torque on the telescopic shafts and the universal joints since all the output torque must be transferred by these components.

EP2241416 discloses a robot with delta kinematics. The robot has a movable platform comprising a joint plate connected with a robot base via three control arms, and a drive. The drive is provided for rotation of a tool that is held by the tool holder. The tool is fixed at the joint plate. The drive comprises a transmission motor, and is accommodated in a housing on the movable platform. The drive is fixed at an upper side of the joint plate. A central bore hole is provided in the joint plate, and an output shaft of the motor extends via the bore hole. A disadvantage with the robot is that the motor adds extra weight to the movable platform.

SUMMARY

It is an aim of the present invention to at least partly overcome the above problems, and to provide an improved parallel kinematic robot.

This aim is achieved by a parallel kinematic robot.

The robot comprises a base unit, a platform movable in relation to the base unit about a plurality of main axes, at least two independently movable actuating arms connected between the base unit and the movable platform for moving the platform in relation the base unit, a tool holder rotatably connected to the platform to allow rotation of the tool holder in relation to the platform about a first auxiliary axis, a motor for driving the first auxiliary axis, wherein the motor is located in the base unit, a gear unit for changing speed and torque of the motor, and an articulated first transmission member for transferring rotational movement from the motor to the platform for rotating the tool holder about the first auxiliary axis. The gear unit comprises a first gearbox located in the base unit and a second gearbox located in the platform, and the first and second gearboxes are connected to the first transmission member.

According to the invention, the gear unit is divided into two gearboxes, and one of the gearboxes is located in the base unit together with the motor, and the other gearbox is located in the platform. By locating one gearbox in the base unit and the other gearbox in the platform, the weight of the gear unit is distributed. Thus, the weight of the movable platform is reduced compared to a robot having the gear unit located in the movable platform. The first and second gearboxes are suitably connected to each other by means of a first transmission member, which transfers rotational movement from the first gearbox to the second gearbox. By dividing the gear unit into two gearboxes it is possible to achieve a larger total ratio of the gear unit, and by that the speed on the first transmission member can be reduced. Another advantage with this design is that the torque on the first transmission member is reduced compared to prior art robots having the gearbox placed in the base unit. The invention provides a parallel kinematic robot with high performance. For example, it is possible for a parallel kinematic robot according to the invention to handle heavy objects, such as objects with a weight of 10 kg and more.

With the term gearbox is meant a casing including a gear train for providing speed and torque conversion from a rotating power source to another device. A gear train is a mechanical system formed by mounting gears so that teeth of the gears engage. A gear is a device, such as a wheel, a section of a shaft, or a belt having teeth of such form, size, and spacing that they mesh with teeth in another device to transmit or receive force and motion. The gears can be different types of gears, for example, gear wheels or timing belts.

The first auxiliary axis allows rotation of the tool holder with respect to the base unit. Another advantage with this design is that it allows an additional auxiliary axis to be attached in the center of the first auxiliary axis to achieve a tilting movement of the tool holder in addition to the rotational movement.

In one aspect of the invention, the robot has three independently movable actuating arms connected between the base unit and the movable platform and three main axes. In this case, the first auxiliary axis is a fourth axis.

In one aspect of the invention, the robot is a 4-axes robot.

In one aspect of the invention, the second gearbox is a single-stage gearbox. With a single-stage gearbox is meant a gearbox having only one gear stage, i. e. only one pair of gears. The final gear stage is placed in the movable platform. Thus, the weight of the movable platform is kept within acceptable limits.

In one aspect of the invention, the first gearbox is a single-stage gearbox. Single-stage gearboxes are advantageous since they have a high ratio between torque and price for industrial applications.

In one aspect of the invention, the first and second gearboxes are single-stage gearboxes.

In one aspect of the invention, the first and second gearboxes comprise any of a spur gear and a helical gear. With a spur gear is meant gears provided with teeth projecting radially. A helical gear differs from a spur gear in that the teeth on helical gears are cut at an angle to the face of the gear.

In one aspect of the invention, the first gearbox comprises a helical gear and said second gearbox comprises a spur gear. An advantage with a helical gear is that it is noiseless. An advantage with the using a spur gear in the second gearbox, instead of a helical gear, is that axial forces on the axillary axis are avoided.

In one aspect of the invention, the first and second gearboxes are single-stage parallel shaft gearboxes. With a parallel shaft gearbox is meant that the rotational axes of the gears are in parallel.

In one aspect of the invention, the second gearbox comprises a pair of gearwheels. Instead of comprising a toothed belt, the second gearbox comprises a pair of gearwheels. Preferably, the gearwheels are made of steel. This results in a robot having a robust and high-performance wrist unit with a long lifetime.

In one aspect of the invention, each of said first and second gearboxes comprises a pair of toothed gear wheels arranged to engage with each other. Preferably, the toothed gear wheels are made of steel to provide a robust and high-performance robot.

In one aspect of the invention, the robot comprises an articulated first transmission member for transferring rotational movement from the motor to the platform for rotating the tool holder about the first auxiliary axis, and the first and second gearboxes are connected to the first transmission member. The first and second gearboxes are connected to each other by means of the first transmission member, which transfers rotational movement from the first gearbox to the second gearbox.

In one aspect of the invention, the first transmission member comprises a telescopic shaft, a first universal joint arranged in an upper end of the telescopic shaft, and a second universal joint arranged in a lower end of the telescopic shaft. The first gearbox is connected to the first universal joint and the second gearbox is connected to the second universal joint.

In one aspect of the invention, the first transmission member is connected to the movable platform at an offset distance from the first auxiliary axis. This makes it possible to have a center hole through the center of the first auxiliary axis, which center hole can be used by the customer to connect electrical/air/other signal/media to the tool. Another advantage is that this embodiment makes it easy to change the tool holder to another tool holder movable about two axes, to achieve a robot with 5 axes instead of 4 axes.

In one aspect of the invention, the platform is provided with a center hole coinciding with the first auxiliary axis to allow cabling to the tool to pass through the platform.

In one aspect of the invention, the second gearbox comprises a rotatable input shaft attached to the first transmission member, a rotatable output shaft attached to the tool holder, a first toothed gear wheel attached to input shaft, and a second toothed gear wheel attached to the rotatable output shaft and arranged to engage with the first toothed gear wheel to transfer rotational movement from the input shaft to the output shaft, wherein the rotational axis of the output shaft coincides with the first auxiliary axis, and the rotational axis of the input shaft is parallel with and spaced apart from the first auxiliary axis. This embodiment makes it possible to arrange the first transmission member at an offset distance from the first auxiliary axis, and by that allow the platform to be provided with a center hole coinciding with the first auxiliary axis to allow cabling to the tool to pass through the platform.

In one aspect of the invention, the first toothed gear wheel is movable in relation to the second toothed gear wheel in a radial direction to allow adjustment of backlash. This embodiment facilitates backlash adjustment of the gear unit.

In one aspect of the invention, the ratio of the first gearbox is larger than the ratio of the second gearbox. Thus, the rotational speed of the first transmission member is kept low and accordingly the inertia of the first transmission member. Thus, the weight on the first transmission member can be kept low.

In one aspect of the invention, the ratio of the first gearbox is larger than 6, and the ratio of the second gearbox is less than 6.

In one aspect of the invention, the ratio of the first gearbox is between 6 and 10, and the ratio of the second gearbox is between 4 and 6. This keeps the inertia of the first transmission member low, while the second gearbox still have a sufficient ratio to gear down a possible play in the gear, and to keep the torque of the first transmission member at a reasonable level.

In one aspect of the invention, the total ratio of the gear unit is larger than 20, preferably larger than 30, and most preferably larger than 35. Thus, the speed on the first transmission member can be kept low.

In one aspect of the invention, the tool holder is connected to the platform to allow rotation of the tool holder in relation to the base unit about a second auxiliary axis perpendicular to the first auxiliary axis, and the robot comprises a second motor, located in the base unit for driving the second auxiliary axis, and a gear unit comprising a third gearbox located in the base unit and a fourth gearbox located in the platform. The second auxiliary axis allows tilting of the tool holder with respect to the base unit. If an additional auxiliary axis is needed, the same idea with a first gearbox in the base unit and a second gearbox in the moving platform can be used. Thus, the weight of the movable platform is reduced compared to a robot having the gear unit located in the movable platform, and the torque on the second transmission member is reduced compared to prior art robots having the gearbox placed in the base unit. Further, the drivetrain of the second auxiliary axis, i.e. the motor, gear unit, and second transmission member, can also be used to provide an external axis out to a customer interface. This axis can, for example, be used to drive customer tooling.

In one aspect of the invention, the robot is a 5-axes robot, and the second auxiliary axis is a fifth axis.

In one aspect of the invention, the robot comprises an articulated second transmission member for transferring rotational movement from the second motor to the platform for rotating the tool holder about the second auxiliary axis, and the third and fourth gearboxes are connected to the second transmission member.

In one aspect of the invention, the fourth gearbox comprises a bevel gear. Bevel gears are used to change the direction of a shaft's rotation. Bevel gears have teeth that are available in straight, spiral or hypoid shape. In this case, it is advantageous to design the second stage gearbox for the second auxiliary axis as a bevel gear, instead of a parallel spur/helical gear, which is suitable for the first auxiliary axis.

In one aspect of the invention, the third gearbox comprises a helical gear.

BRIEF DESCRIPTION OF THE DRAWINGS

The invention will now be explained more closely by the description of different embodiments of the invention and with reference to the appended figures.

DETAILED DESCRIPTION

Figure 1:
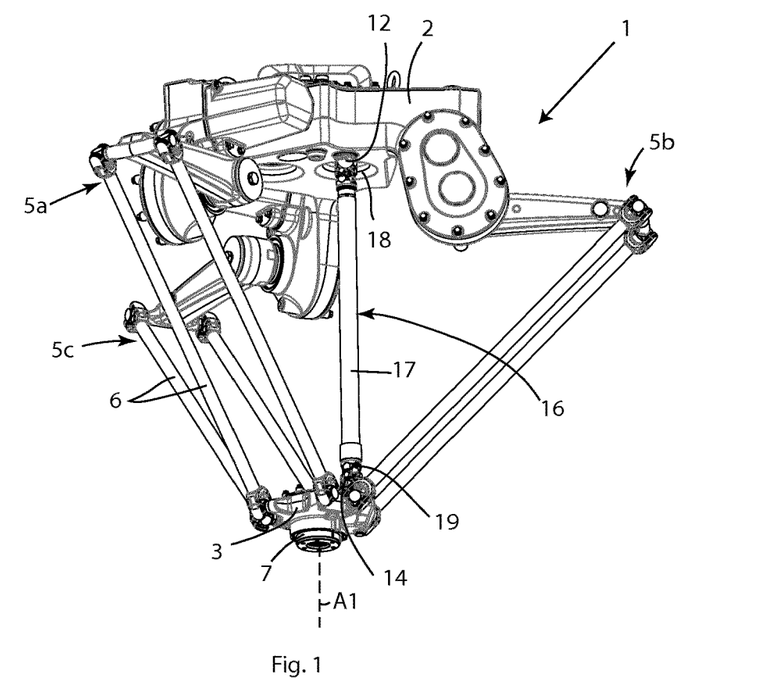
FIG. 1 shows an example of a parallel kinematic robot having four axes according to an embodiment of the invention.

FIG. 1 shows an example of a parallel kinematic robot 1 having four axes according to a first embodiment of the invention. The robot 1 comprises a base unit 2, a platform 3 movable in relation to the base unit about a plurality of main axes. Apart from the fourth axis and the drive of the fourth axis, the robot is a parallel kinematic robot 1 according to the prior art. Therefore, the parts of the robot related axes 1-3 are only briefly described hereinbelow.

The base unit 2 is designed to be stationary, for example, suspended or attached to a roof or a wall. The platform 3 is movable in relation to the base unit 2 by means of at least two independently movable actuating arms connected between the base unit and the movable platform. For a parallel kinematic robot, for movement of the platform with three degrees of freedom, three arms are required. In this example, the robot has three arms 5a-c arranged to move the platform about three axes. Each arm comprises a link arrangement connected to the movable platform. Each arm is actuated by an actuator preferably arranged in the base unit to reduce the moving mass. The link arrangements transfer forces to the movable platform. In this example, each of the arms 5a-c comprises two links 6. However, the number of links can vary.

In this example, each of the arms 5a-c includes an inner arm part pivotally connected to the base unit, and an outer arm part including two links 6 pivotally connected to inner arm part and to the platform 3, and an actuator for actuating the arm disposed in the base unit. The robot also includes a control system (not shown in the figures) for controlling the movements of the platform.

The robot further comprises a tool holder 7 arranged for carrying an object, such as a tool or a work piece. The tool holder is provided with means for attaching the object to the tool holder. The means are, for example, a plurality of through holes. For example, the tool holder comprises a turn plate. The tool holder 7 is rotatably connected to the platform 3 to allow rotation of the tool holder in relation to the platform about a first auxiliary axis A1. In this example, the first auxiliary axis is a fourth axis.

The robot comprises a drive system including a motor 9 and a gear unit for driving the rotation of the tool holder about the first auxiliary axis A1. The motor 9 is located in the base unit 2. The gear unit comprises a first gearbox 12 located in the base unit 2 and connected to the motor, and a second gearbox 14 located in the platform 3.

Figure 2:
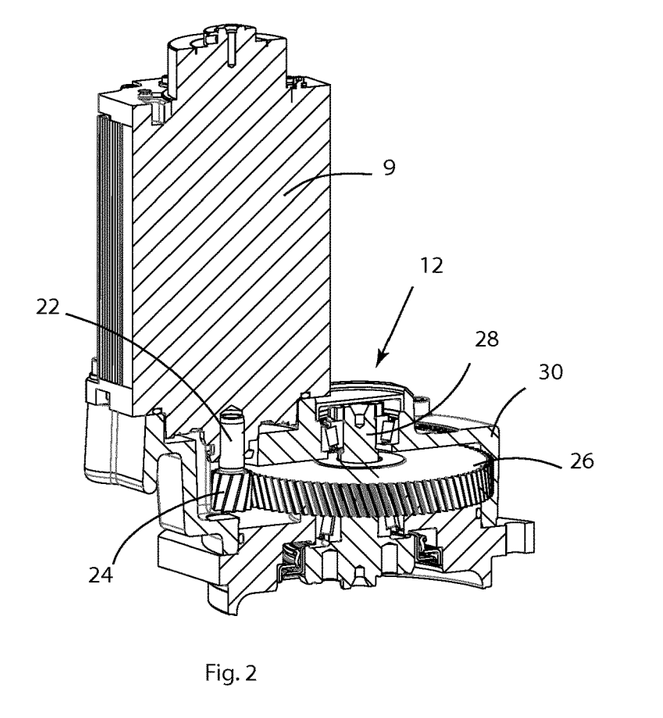
FIG. 2 shows the motor and a first gearbox located in the base unit.
Figure 3A:
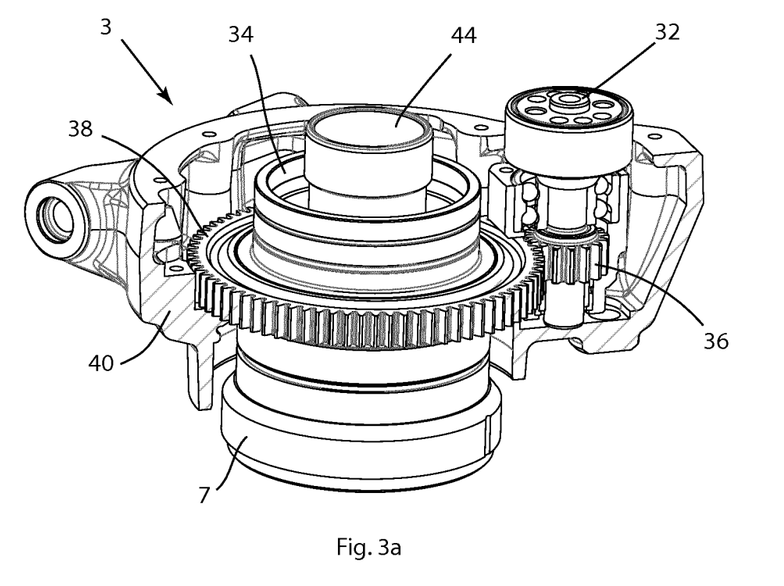
FIG. 3a shows a second gearbox located in the movable platform.
Figure 3B:
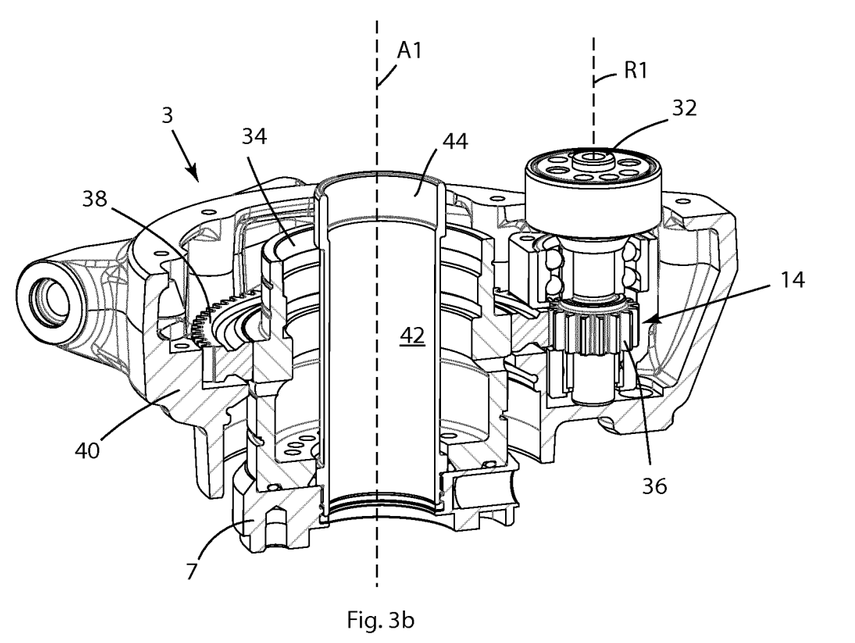
FIG. 3b shows the second gearbox in a cross section.

FIG. 2 shows the motor 9 and the first gearbox 12 located in the base unit, and FIGS. 3a-b show the second gearbox 14 located in the platform 3. The robot comprises an articulated first transmission member 16 for transferring the rotational movement from the first gearbox 12 to the second gearbox 14 for rotating the tool holder about the first auxiliary axis. The first transmission member 16 is elongated, and the first gearbox 12 is connected to an upper part of the first transmission member, and the second gearbox 14 is connected to a lower part of the first transmission member. In this example, the first transmission member comprises a telescopic shaft 17, a first universal joint 18 arranged in an upper end of the telescopic shaft, and a second universal joint 19 arranged in a lower end of the telescopic shaft. The first gearbox 12 is connected to the first universal joint 18 and the second gearbox 14 is connected to the second universal joint 19.

In this example, the first gearbox 12 comprises a helical gear and the second gearbox comprises a spur gear. Alternatively, both gearboxes comprise a spur gear or a helical gear. The motor 9 has a motor shaft 22. The first gearbox 12 comprises a rotatable output shaft 28. The first gearbox 12 comprises a pair of gear wheels including a first gear wheel 24 in the form of a pinion, and a second gear wheel 26 in the form of a crown wheel arranged to engage with the first gear wheel 24 to transfer rotational movement from the motor shaft 22 to the output shaft 28, as shown in FIG. 2. The first gear wheel 24 is attached to the motor shaft 22. The second gear wheel 26 is attached to the output shaft 28. The first gearbox 12 further comprises a housing 30 surrounding the gear wheels 24, 26. In this example, the first gearbox 12 is a single-stage parallel shaft gearbox. The first and second gear wheels 24, 26 are arranged so that the rotational axes of the gear wheels 24, 26 are in parallel. Further, the rotational axes of the first gear wheel 24 and the motor shaft 22 coincide, and the rotational axes of the second gear wheel 26 and the output shaft 28 coincide. The motor shaft and the output shaft are arranged in parallel and spaced apart. The first and second gear wheels 24, 26 are provided with teeth, in this example the teeth are cut at an angle to the outer surface of the gear wheel to provide a helical gear. The output shaft 28 is attached to the first universal joint 18 of the first transmission member. In this example, the second gear wheel 26 is larger than the first gear wheel 24 to provide a reduction of the speed of the rotational movement from the motor 9, and accordingly to reduce the speed of the telescopic shaft 17. Preferably, the first and second gear wheels 24, 26 are designed so that the ratio of the first gearbox 12 is larger than 6, and suitably so that the ratio of the first gearbox is between 6 and 10 to achieve a suitable rotational speed of the telescopic shaft 17.

In this example, the second gearbox 14 comprises a rotatable input shaft 32 and a rotatable output shaft 34 attached to the tool holder 7, and a pair of gear wheels including a first gear wheel 36 attached to the input shaft 32, and a second gear wheel 38 attached to the rotatable output shaft 34 and arranged to engage with the first gear wheel to transfer rotational movement from the input shaft to the output shaft, as shown in FIG. 3a-b. The second gearbox 14 further comprises a gear housing 40 surrounding the gear wheels 36 and 38. In this example, the second gearbox is single-stage parallel shaft gearbox. The first and second gear wheels 36 and 38 are arranged so that the rotational axes of the gear wheels 36, 38 are in parallel. The rotational axis of the output shaft 34 coincides with the first auxiliary axis A1, and the rotational axis R1 of the input shaft 32 is parallel with and spaced apart from the first auxiliary axis A1. The input shaft 32 and the output shaft 34 of the second gearbox are arranged in parallel and spaced apart. The first and second gear wheels 36, 38 are provided with teeth. In this example the gear wheels 36, 38 are provided with teeth projecting radially to provide a spur gear. The input shaft 32 is attached to the second universal joint 19 of the first transmission member 16. In this example, the second gear wheel 38 is larger than the first gear wheel 36 to provide a reduction of the speed of the rotational movement from the telescopic shaft 17, and accordingly a reduction of the rotational speed of the tool holder 7 is achieved. Preferably, the ratio of the first gearbox 12 is larger than the ratio of the second gearbox 14. Preferably, the first and second gear wheels 36, 38 are designed so that the ratio of the second gearbox 14 is less than 6, and suitably so that the ratio of the second gearbox 14 is between 4 and 6 to achieve a suitable rotational speed of the tool holder 7. For example, the total ratio of the gear unit is between 36 and 45, and typically 40.

In one aspect, the first gear wheel 36 of the second gearbox is arranged movable in relation to the second gear wheel 38 in a radial direction to allow adjustment of backlash. The platform 3 is provided with a center hole 42 coinciding with the first auxiliary axis A1 to allow cabling to the tool to pass through the platform. In this example, the output shaft 34 of the second gearbox is tubular and the platform comprises a center tube 44 arranged inside the output shaft 34 and coaxial with the output shaft 34. The center tube 44 defines the center hole 42.

Figure 4A:
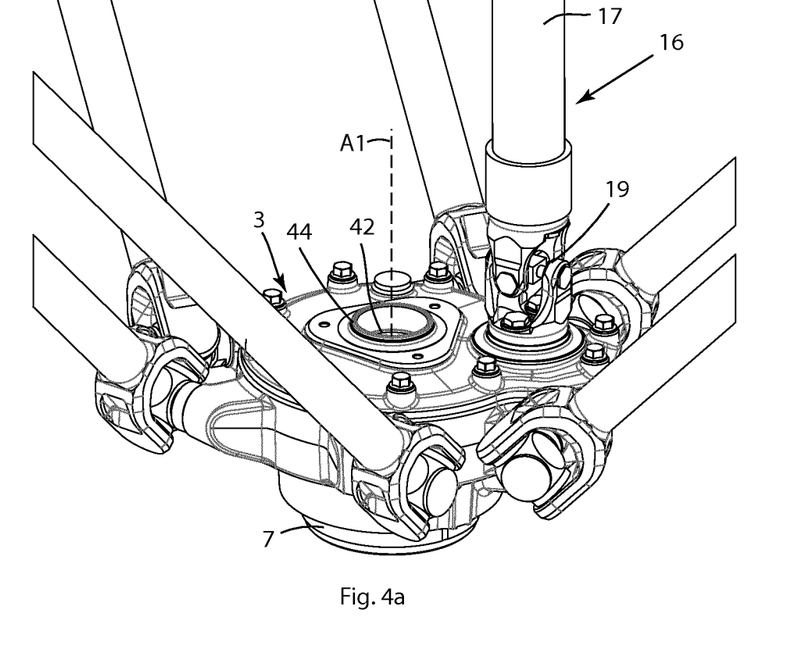
FIGS. 4a-b show an example of a movable platform for a robot having four axes in upper and lower perspective views.
Figure 4B:
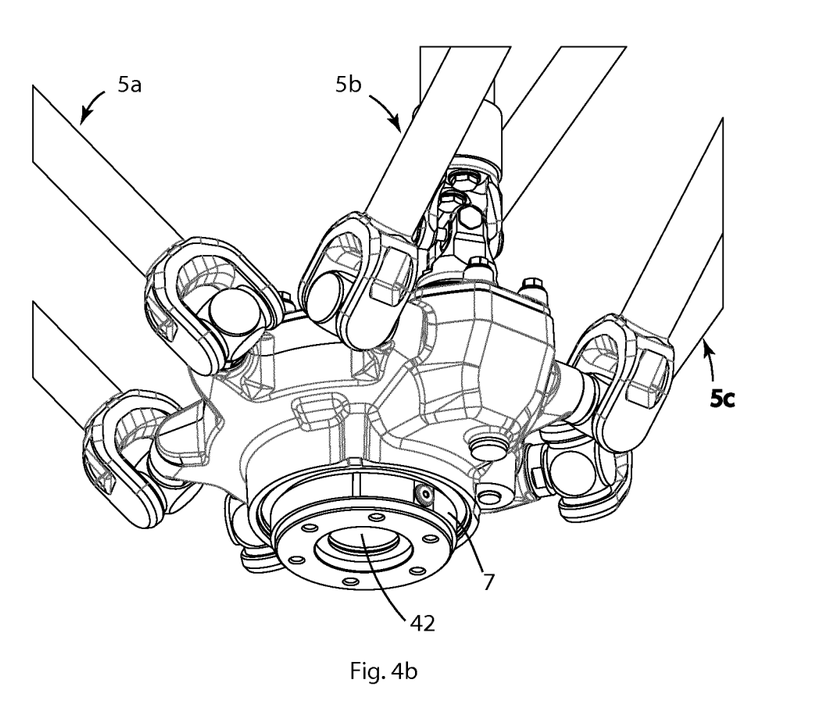

FIGS. 4a-b show the movable platform 3 in upper and lower perspective views. As seen from the figures, the first transmission member 16, including the telescopic shaft 17 and the first and second universal joints 18, 19, is connected to the movable platform 3 at an offset distance from the first auxiliary axis A1.

Figure 5:
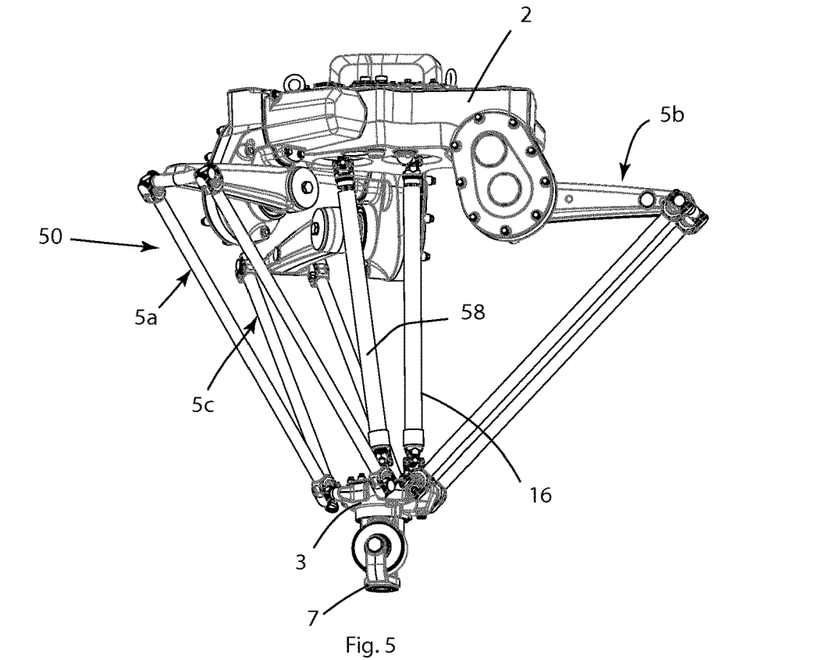
FIG. 5 shows a perspective view of an example of a parallel kinematic robot having five axes according to another embodiment of the invention.
Figure 6:
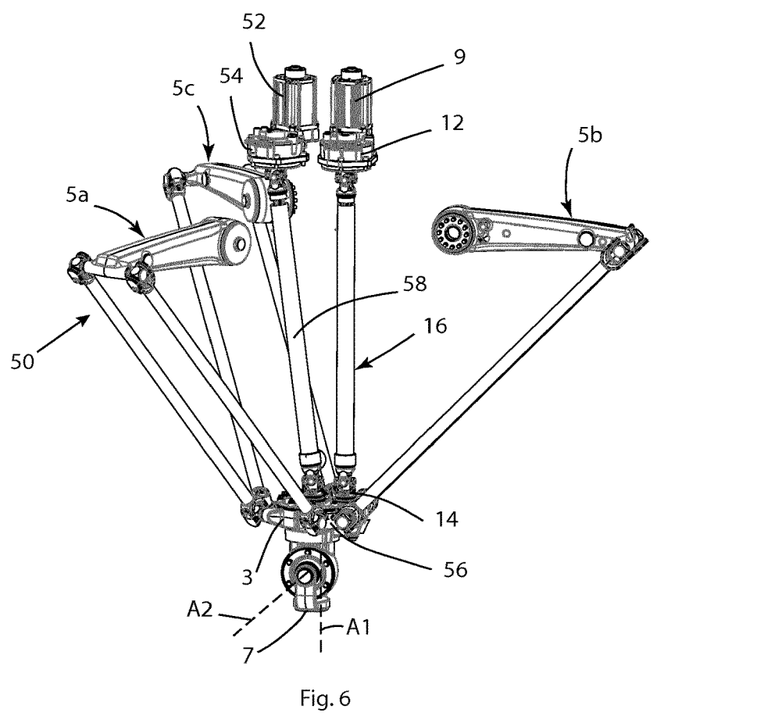
FIG. 6 shows the parallel kinematic robot shown in FIG. 5 partly disassembled.

In the following another example of a parallel kinematic robot according to the invention will be described. This robot has five axes. FIG. 5 shows a perspective view of an example of a parallel kinematic robot 50 having five axes. FIG. 6 shows the robot shown in FIG. 5 partly disassembled. Like or corresponding parts in the FIGS. 1-8 are indicated with like numerals.

In this embodiment the tool holder 7 is connected to the platform 3 to allow rotation of the tool holder in relation to the platform about a first auxiliary axis A1 and a second auxiliary axis A2 perpendicular to the first auxiliary axis A1. In this example, the drive system of the first auxiliary axis A1 is the same as described with references to FIGS. 1-4. The robot comprises a second motor 52 and a second gear unit for driving the second auxiliary axis A2. The second motor 52 is located in the base unit 2. The gear unit comprises a third gearbox 54 located in the base unit 2 and a fourth gearbox 56 located in the platform 3. The robot further comprises an articulated second transmission member 58 for transferring rotational movement from the second motor 52 to the platform 3 for rotating the tool holder 7 about the second auxiliary axis A2. The third and fourth gearboxes 54, 56 are connected to the second transmission member. The second transmission member is designed in the same way as the first transmission member. The second transmission member comprises a telescopic shaft, a first universal joint arranged in an upper end of the telescopic shaft, and a second universal joint arranged in a lower end of the telescopic shaft, and the third gearbox is connected to the first universal joint and the fourth gearbox is connected to the second universal joint. The third gearbox 54 is designed in the same way as the first gearbox 12, as shown in FIG. 2.

Figure 7:
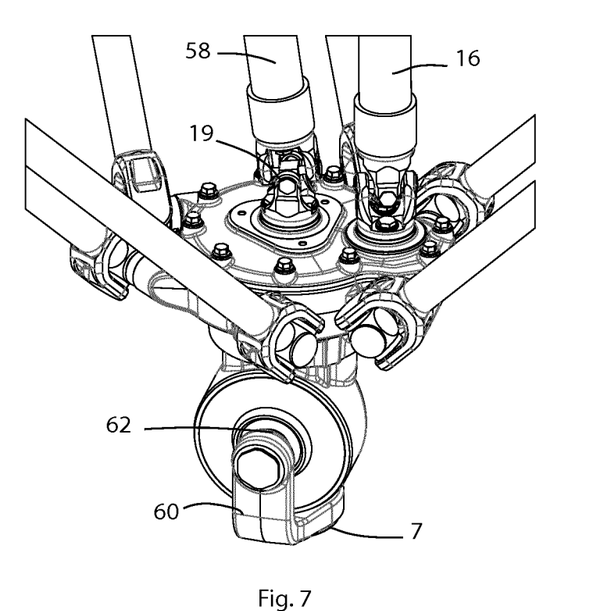
FIG. 7 shows an example of a movable platform for a robot having five axes in a perspective view.

FIG. 7 shows an example of the movable platform 3 for the robot having five axes in a perspective view. To achieve a tilting movement of the tool holder 7, the robot is provided with a swing arm 60 attached to an output shaft 62 of the fourth gearbox 56.

Figure 8:
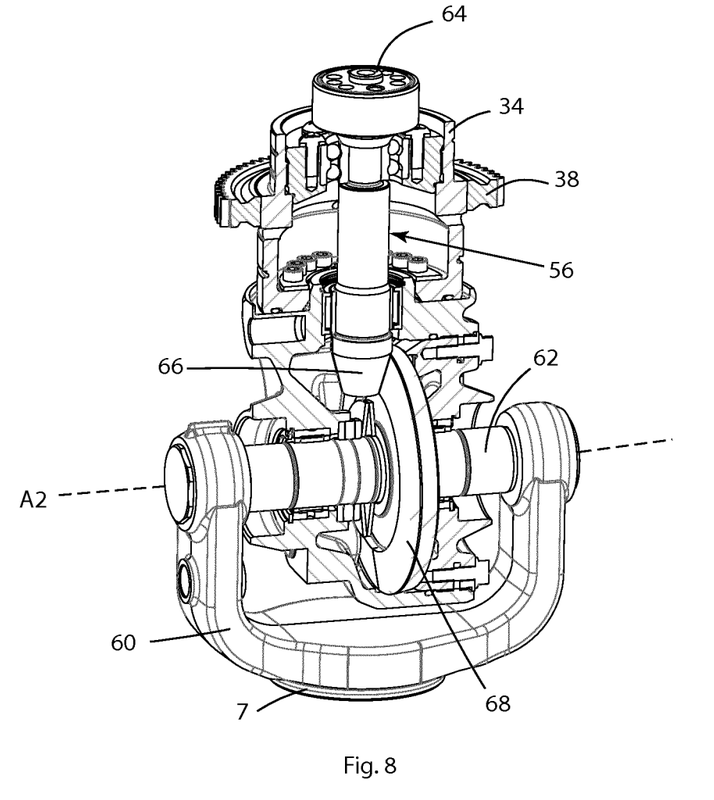
FIG. 8 shows the fourth gearbox located in the movable platform.

FIG. 8 shows the fourth gearbox located in the movable platform. In this example, the fourth gearbox 56 comprises a rotatable input shaft 64 and a rotatable output shaft 62 attached to the swing arm 60, and a pair of gear wheels including a first gear wheel 66 attached to input shaft 64, and a second gear wheel 68 attached to the rotatable output shaft 62 and arranged to engage with the first gear wheel 66 to transfer rotational movement from the input shaft 64 to the output shaft 62, as shown in FIG. 8. In this example, the fourth gearbox 56 is a bevel gear. The first and second gear wheels 66 and 68 are arranged so that their rotational axes are perpendicular to each other. The rotational axis of the output shaft 62 coincides with the second auxiliary axis A2. The rotational axis of the input shaft 64 coincides with the first auxiliary axis A1 and the rotational axis of the second gear wheel 38 of the second gearbox 14. The rotational axis of the input shaft 64 is parallel with and spaced apart from the rotational axis of the first gear wheel 36 of the second gearbox 14. The first and second gear wheels 66, 68 are provided with teeth (not shown in the figure) designed to engage with each other. The input shaft 64 is attached to the second universal joint 19 of the first transmission member 58. In this example, the first gear wheel 66 is smaller than the second gear wheel 68 to provide a reduction of the speed of the rotational movement from the telescopic shaft 17, and accordingly a reduction of the rotational speed of the tool holder 7. Preferably, the ratio of the third gearbox 54 is larger than the ratio of the fourth gearbox 56. Preferably, the first and second gear wheels 66, 68 are designed so that the ratio of the fourth gearbox 56 is less than 6, and suitably so that the ratio is between 4 and 6 to achieve a suitable rotational speed of the tool holder.

The present invention is not limited to the embodiments disclosed but may be varied and modified within the scope of the following claims. For example, the ratio of the first gearbox and the ratio of the second gearbox may vary outside the previously mentioned preferred limits. For example, the ratio of the first gearbox can be smaller than the ratio of the second gearbox. The first and second gearboxes may comprise other types of gears. For example, the first gearbox may comprise a spur gear, a bevel gear or a hypoid type of gear, and the second gearbox may comprise a helical gear, or a planetary gear. It is also possible to use a timing belt instead of gear wheels.

The invention claimed is:

1. A parallel kinematic robot comprising:
a base unit,
a platform movable in relation to the base unit about a plurality of main axes, at least two independently movable actuating arms connected between the base unit and the movable platform for moving the platform in relation to the base unit, a tool holder rotatably connected to the platform to allow rotation of the tool holder in relation to the platform about a first auxiliary axis, a motor for driving the first auxiliary axis, located in the base unit, and a gear unit for transferring rotational movement from the motor to the platform, characterized in that the gear unit includes a first gearbox located in the base unit and a second gearbox located in the platform, wherein the robot comprises an articulated first transmission member for transferring rotational movement from the motor to the platform for rotating the tool holder about the first auxiliary axis, and the first and second gearboxes are connected to the first transmission member, and wherein the first transmission member is connected to the movable platform at an offset distance from the first auxiliary axis, and the platform is provided with a center hole coinciding with the first auxiliary axis to allow cabling to a tool to pass through the platform.

2. The parallel kinematic robot according to claim 1, wherein said first gearbox comprises a helical gear and said second gearbox comprises a spur gear.

3. The parallel kinematic robot according to claim 2, wherein said first and second gearboxes are single-stage parallel shaft gearboxes.

4. The parallel kinematic robot according to claim 2, wherein said second gearbox comprises first and second toothed gear wheels arranged to engage with each other.

5. The parallel kinematic robot according to claim 1, wherein said first and second gearboxes are single-stage parallel shaft gearboxes.

6. The parallel kinematic robot according to claim 1, wherein said second gearbox comprises first and second toothed gear wheels arranged to engage with each other.

7. The parallel kinematic robot according to claim 6, wherein the second gearbox includes a rotatable input shaft attached to the first transmission member, and a rotatable output shaft attached to the tool holder, the first toothed gear wheel is attached to the input shaft, the second toothed gear wheel is attached to the output shaft and arranged to engage with the first toothed gear wheel to transfer rotational movement from the input shaft to the output shaft, wherein the rotational axis of the output shaft coincides with the first auxiliary axis, and the rotational axis of the input shaft is parallel with and spaced apart from the first auxiliary axis.

8. The parallel kinematic robot according to claim 7, wherein the first toothed gear wheel is movable in relation to the second toothed gear wheel in a radial direction to allow adjustment of backlash.

9. The parallel kinematic robot according to claim 7, wherein the first transmission member includes a telescopic shaft, a first universal joint arranged in an upper end of the telescopic shaft, and a second universal joint arranged in a lower end of the telescopic shaft, and said first gearbox is connected to the first universal joint and said second gearbox is connected to the second universal joint.

10. The parallel kinematic robot according to claim 1, wherein the first transmission member includes a telescopic shaft, a first universal joint arranged in an upper end of the telescopic shaft, and a second universal joint arranged in a lower end of the telescopic shaft, and said first gearbox is connected to the first universal joint and said second gearbox is connected to the second universal joint.

11. The parallel kinematic robot according to claim 1, wherein a ratio of the first gearbox is larger than a ratio of the second gearbox.

12. The parallel kinematic robot according to claim 1, wherein a ratio of the first gearbox is larger than 6, and a ratio of the second gearbox is less than 6.

13. The parallel kinematic robot according to claim 1, wherein a ratio of the first gearbox is between 6 and 10, and a ratio of the second gearbox is between 4 and 6.

14. The parallel kinematic robot according to claim 1, wherein the tool holder is allowed to rotate in relation to the platform about a second auxiliary axis perpendicular to the first auxiliary axis, and the robot including a second motor, located in the base unit for driving the second auxiliary axis, and a gear unit having a third gearbox located in the base unit and a fourth gearbox located in the platform.

15. The parallel kinematic robot according to claim 14, wherein said fourth gearbox includes a bevel gear.

16. The parallel kinematic robot according to claim 14, wherein the robot includes an articulated second transmission member for transferring rotational movement from the second motor to the platform for rotating the tool holder about the second auxiliary axis, and the third and fourth gearboxes are connected to the second transmission member.

17. The parallel kinematic robot according to claim 16, wherein said fourth gearbox includes a bevel gear.

* * * * *